United States Patent [19]
Smitt

[11] Patent Number: 5,117,295
[45] Date of Patent: May 26, 1992

[54] STRUCTURE FOR AND METHOD OF SCANNING WITH MULTIPLEXED LIGHT SENSOR ARRAYS

[75] Inventor: Asbjorn Smitt, Aalsgaarde, Denmark

[73] Assignee: Contex Components & Business Machines A/S, Denmark

[21] Appl. No.: 434,456

[22] Filed: Nov. 13, 1989

[51] Int. Cl.$^5$ .................... H04N 1/40; H04N 1/10
[52] U.S. Cl. .................................................. 358/474
[58] Field of Search ............ 358/474, 475, 484, 494, 358/497, 482, 483, 486, 488, 496; 355/75

[56] References Cited

U.S. PATENT DOCUMENTS

| | | | |
|---|---|---|---|
| 4,465,939 | 8/1984 | Tamura | 358/494 |
| 4,774,592 | 9/1988 | Suzuki et l. | 358/494 |

FOREIGN PATENT DOCUMENTS

| | | | |
|---|---|---|---|
| 0128213 | 11/1978 | Japan | 358/482 |
| 0006708 | 1/1979 | Japan | 358/482 |
| 0129869 | 10/1980 | Japan | 358/474 |
| 0025868 | 3/1981 | Japan | 358/474 |
| 0081769 | 5/1982 | Japan | 358/482 |
| 0009466 | 1/1983 | Japan | 358/482 |
| 0042359 | 3/1983 | Japan | 358/474 |
| 0043657 | 3/1983 | Japan | 358/474 |
| 0050859 | 3/1983 | Japan | 358/474 |
| 0111567 | 7/1983 | Japan | 358/474 |
| 0119262 | 7/1983 | Japan | 358/474 |
| 0151573 | 8/1984 | Japan | 358/474 |
| 0160370 | 9/1984 | Japan | 358/474 |

*Primary Examiner*—Jin F. Ng
*Assistant Examiner*—Jerome Grant, II
*Attorney, Agent, or Firm*—Willian Brinks Olds Hofer Gilson & Lione

[57] ABSTRACT

At least two line segments of discrete elements forming part of a line of discrete elements are aligned to form a line. Each line segment is collected by a light sensitive sensor array (2, 3) having a number of light sensitive cells forming a segment vector (80). Each sensor array (2, 3) has a total visional field which is divided into an active visional field and a visional field edge, that aligning means, present in the coinciding visual field of two sensor arrays are imaged by initialization in at least one cell in the segment vector (80). The active visional fields of the sensory arrays are determined in dependence on the position of the aligning means in the segment vector (80). The line is joined by the cells (84) of the segment vectors, which cells (84) represent the active visional field, while the cells (82) representing the visional field edge are skipped.

11 Claims, 5 Drawing Sheets

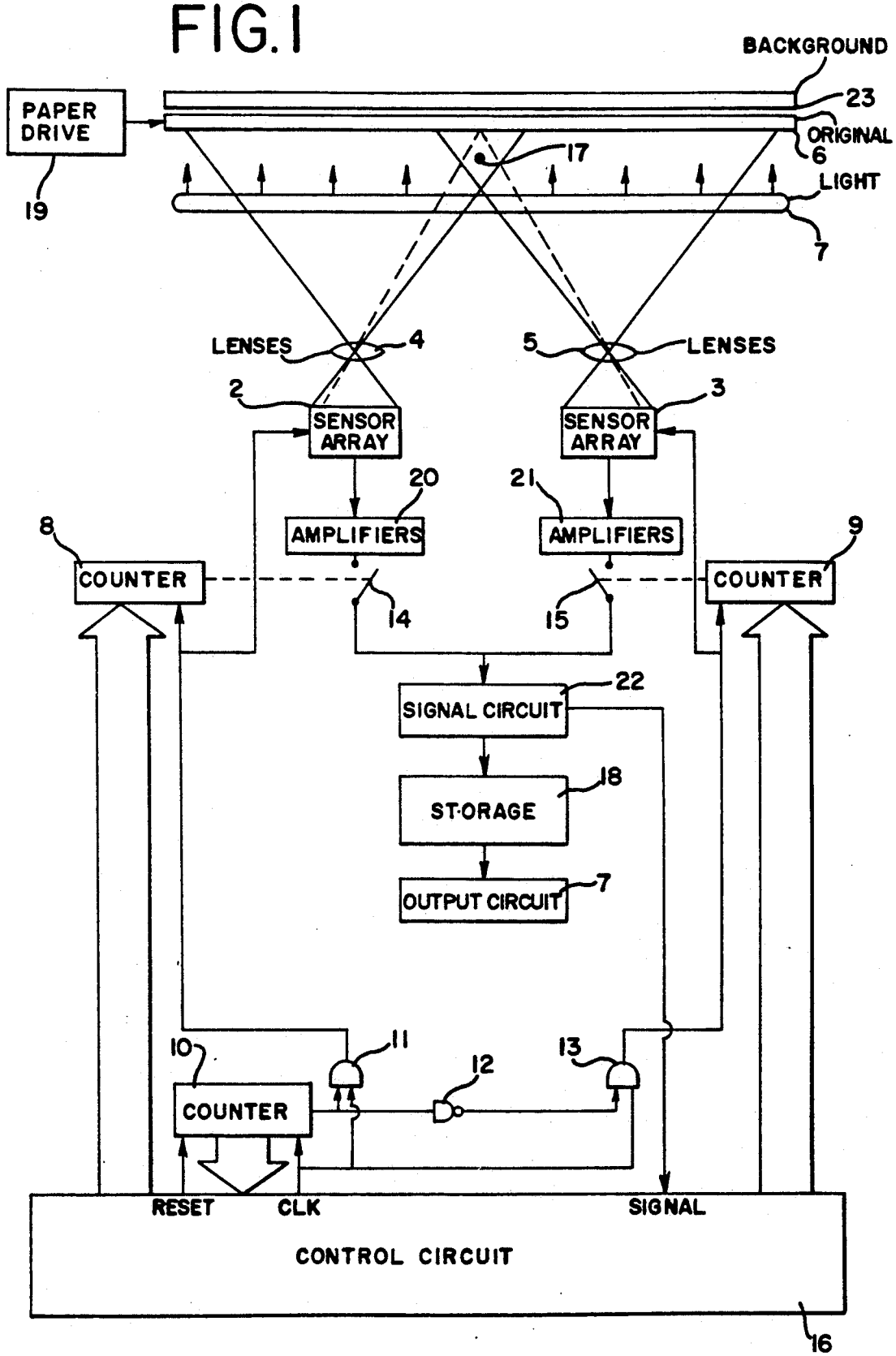

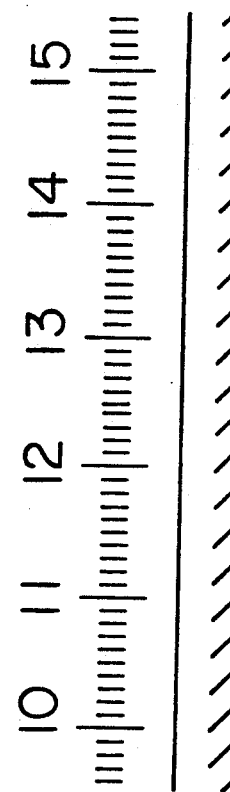
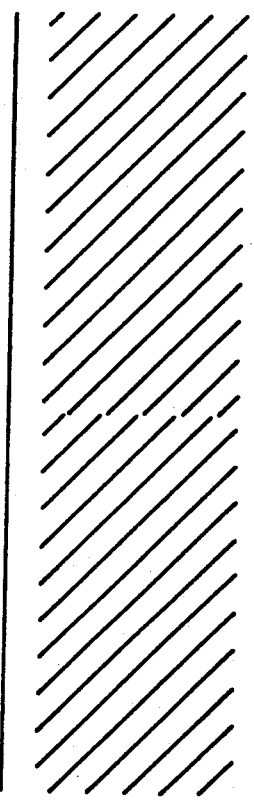
FIG.3
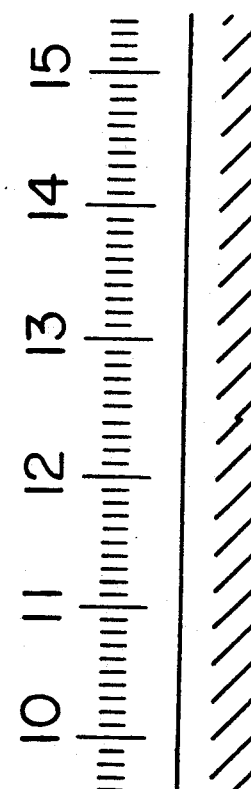
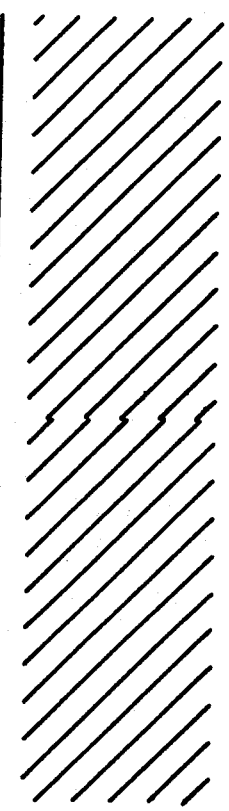
FIG.4
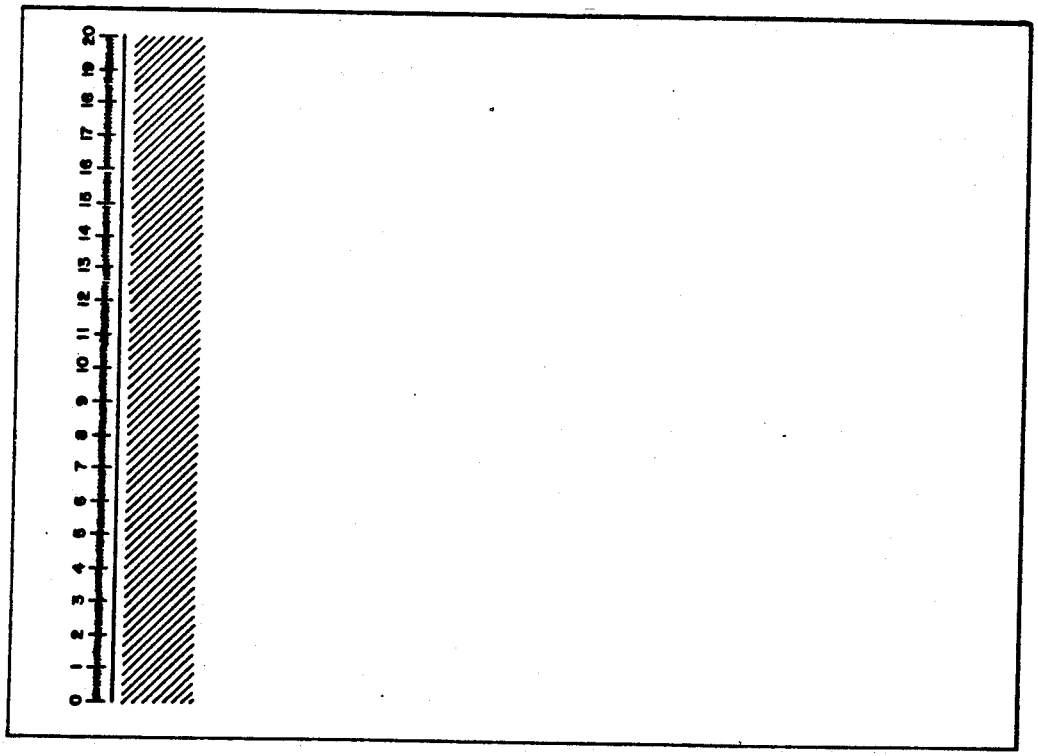
FIG.2

STRUCTURE FOR AND METHOD OF SCANNING WITH MULTIPLEXED LIGHT SENSOR ARRAYS

The present invention relates to a method of aligning several partial images or partial lines from a number of sensor arrays to form a matrix built two dimensional image of an original, and an apparatus for carrying out the method.

BACKGROUND OF THE INVENTION

In the past, scanning of large original drawings or the like, and of documents and pictures at high resolutions for computer storage and processing purposes has been accomplished by rotating drum multipass scanners or lately by scanners containing multiple modular sensors.

The prior equipment has been deficient in that it is extremely expensive, often complicated and difficult to operate. Further, the equipment of the past has often lacked the ability to maintain its accuracy of scanning, especially if moved, and thus required expensive skilled technicians on-site for re-adjustment. Prior equipment having multiple modular sensors often has suffered from distortion of the scanned image due to mechanical misalignment of the multiple modular sensors, giving overlap between adjacent sensors leading to doubling of pixels in the scanned image, or giving separation between adjacent pixel sensors leading to missed pixels in the scanned image.

It is the object of the invention to devise a method and an apparatus by which it is possible to align line segments, separately or in a matrix built image, the individual line segments being collected by a number of sensor arrays.

The object is obtained in that each sensor array has a total visual field which is divided into an active visual field and a visual field edge where aligning means present in a visual field falling within two sensor arrays is depicted by initialization in at least one element in a segment vector, whereafter the active visual fields of the sensor arrays are determined in dependence on the position of the aligning means in the segment vectors, and where the lines are aligned by the cells of the segment vectors representing the active visual field, whereas the cells representing the visual field edge are skipped.

The method is carried out by means of an apparatus being characterized in that two adjacent sensor arrays have partly coinciding visual fields, that aligning means are provided at such place in an area between the object plane and the sensor arrays where the visual fields of the latter coincide, that means are provided for determining the pixel position of the aligning means in the segment vectors, and that means are provided for multiplexing the segment vectors so as to become aligned to form a line vector, the pixel of which represent the entire line, the alignment being adapted for skipping the pixels of the segment vectors between the extreme point of the individual segment vectors and the pixel position of the aligning means.

By positioning the aligning means in the said area it will not form part of the image collected during the sensing, as it is imaged in the visual field edge which is skipped during the sensing.

It is possible to carry out the invention with stationary sensor arrays which e.g. by means of line CCD-sensors scan intelligence on an original while the latter is driven past the sensor arrays. It is also possible to scan intelligence on a stationary original while the sensor arrays are driven past the original. Finally, the original may be stationary in relation to the sensor arrays which may then be composed by a number of CCD-cameras, the aggregate visional field of which substantially corresponds to the area of the original.

BRIEF DESCRIPTION OF THE DRAWINGS

The invention will be explained in more detail in the following description of some embodiments, reference being made to the drawings, in which:

FIG. 1 shows a preferred embodiment of the system of the invention, where two sensor arrays are multiplexed and aligned.

FIG. 2 shows an example of a test pattern for initial alignment of the sensor arrays.

FIG. 3 shows the test pattern of FIG. 2 scanned by the system of FIG. 1, having gap fault in the alignment of the multiplexed sensor arrays.

FIG. 4 shows the test pattern of FIG. 2 scanned by the system of FIG. 1, having overlap fault in the alignment of the multiplexed sensor arrays.

Figure 5:
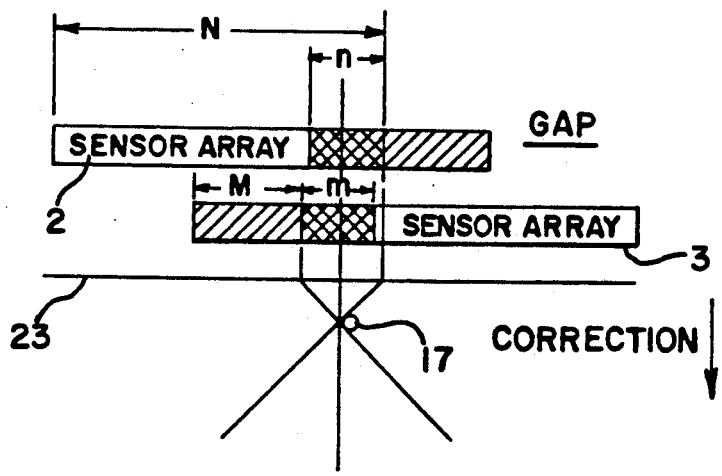
FIG. 5 shows correction of the gap fault of FIG. 3 by adjusting the wire.

As appears from FIG. 1, the scanning structure according to a preferred embodiment of the invention has a light source 1 illuminating an original 6 positioned on a background 23, the original being driven by a paper drive structure 19 of known design. The light reflected from the original 6 is passed through lenses 4 and 5 on a preferably modular dectector e.g. having two sensor arrays 2 and 3, each generating electrical output signals representing the light intensity in line segments transversely to the direction of drive of the original 6. The sensor arrays 2, 3 may advantageously be CCD-line sensors comprising a number of light sensitive cells, the light sensitivity of which may be limited to narrow spectral bands or comprise wide bands, such as the entire visible spectrum. The CCD's represent the scanned intelligence in vector form, the intelligence advantageously being transferred to a buffer unit which may be built integral with the respective sensor arrays 2, 3 and which then comprises the segment vectors, the elements of which may then be clocked out separately by a clock signal from a control circuit 16. The elements of the segment vector are transferred in the form of electrical signals from the sensor arrays 2, 3 through amplifiers 20, 21 and switches 14, 15 to a signal circuit 22 which is connected to a storage 18 and to the control circuit 16. The storage 18 is connected to an output circuit 7 which may be connected to external units, such as printers, modems and external computers. The control circuit 16 controls the scanning of intelligence from the sensor arrays 2, 3, which takes place via a logical circuit comprising two AND-gates 11, 13 and an inverter 12, and being so connected that only one of the sensor arrays 2, 3 at a time receives a clock signal. The logical circuit receives a control signal from a counter 10, the status of which is controlled by the control circuit 16 which also controls the status in two down counters 8, 9 being counted down by the same clock signals that are passed to the sensor arrays 2, 3. The down counters 8, 9 open and close the switches 14, 15 in dependence on the status of the counter. The amplifiers 20, 21 amplify and digitalize the signals sensed by the sensor arrays 2, 3. The switches 14, 15 multiplex the segment vectors from the individual sensor arrays 2, 3 to form a line vector representing a line transversely to the original 6, the control circuit 16, the counters 8, 9 and 10 and the logical circuit 11, 12 and 13 ensuring that the joining of the segment vectors is aligned.

The amplified, aligned and digitalized signals are then stored in the storage 18 for outputting by the output circuit 7 to provide scanned data of intelligence for later storage and processing in a computer.

More particularly, the light source 1 may be a plurality of separate light sources for directing light to the original 6, such as a drawing having lines thereon which are dark to the individual sensors of the sensor arrays 2 and 3. Alternatively the light source 1 may be a single light source for energizing the individual sensors either by light directly reflecting from the original 6, or with a translucent original 6 with light reflecting from the original 6 in combination with the background 22. The light source 1, whether it is a multiple light source or a single light source, may be a light source emitting only a predetermined light colour for sensitizing correspondingly limited sensors.

The original 6 may be for example a sheet of tracing paper having dark pencil or ink lines thereon, which it is desired to scan. Such originals may be in a plurality of sizes a, for example 8.5×11, 18×24, 24×36 or 30×42 inches. The intelligence on the original 6 may be in the nature of lines as in technical drawings or maybe letters, pictures, diagrams or the like.

Amplifiers 20 and 21 may be a plurality of electrical amplifiers for amplifying the electrical signals produced by the sensor arrays 2 and 3, and a plurality of electrical amplifiers with filtering characteristic for modifying and enhancing the electrical signals produced by the sensor arrays 2 and 3.

The down counters 8, 9 govern the switches 14, 15, respectively so that the switch 14 is closed when the down counter 8 contains a positive value and is open when the content is zero. Correspondingly, the switch 15 is open at positive values in the down counter 9, while a zero closes the switch 15.

Down counter 8 governs the switch 14, with switch 14 closed at positive values in down counter 8, and switch 14 open at zero value up down counter 8. Down counter 9 governs switch 15, with switch 15 open at positive values in down counter 9, and switch 15 closed at zero value in down counter 9. Down counters 8 and 9 are broadside loadable from the count has reached the number of sensors in each of the sensor arrays 2 and 3.

PRE-SCAN

In operation, prior to scanning of the original 6, a pre-scan of a wire 17 against the background 22 is performed to adaptively find the set values for down counters 8 and 9 to approximately multiplex the signals produced by sensor arrays 2 and 3, via switches 14 and 15 at the identical crossover point.

The pre-scan is initialized by down counter 8 being broadside loaded by control circuit 16 with the number corresponding to the number of individual sensors in sensor array 2, and down counter 9 being broadside loaded with an arbitrary positive integer by control circuit 16, assuring switch 14 will be closed and switch 15 open. Counter 10 is reset to zero, the output signal from counter 10, holding AND-gate 11 open to the clock signal from control circuit 16 to down counter 8 and sensor array 2, and through inverter 12 holding AND-gate 13 closed to clock signal from control circuit 16 to down counter 9 and sensor array 3.

The clock signal from control circuit 16 clocks out the individual sensor signals from sensor array 2, through amplifiers 20, switch 14, signal circuit 22 to control circuit 16, and simultaneously decrements down counter 8 and increments up counter 10. Upon the control circuit 16 detecting the transition in signal from the signal circuit 22 corresponding to the wire 17, it stores the count of counter 10 as a value N. Upon counter 10 reaching the count corresponding to number of sensors in sensor array 2 and down counter 8 simultaneously reaching zero, switch 14 opens and output of counter 10 toggles to close AND-gate 11 and through inverter 12 opens AND-gate 13 to clock signal from control circuit 16 to down counter 9 and sensor array 3, control circuit 16 simultaneously broadside loads down counter 9 with the number zero, assuring switch 15 is closed.

The clock signal from control circuit 16 clocks out the individual sensor signals from sensor array 3, through amplifiers 21, switch 15, signal circuit 22 to control circuit 16, and simultaneously increments counter 10 from zero. Upon the control circuit 16 detecting the transition in signal from the signal circuit 22 corresponding to the wire 17, it stores the count of couter 10 as value M.

SCANNING

In operation of scanning the original 6, following the pre-scan, the control circuit 16 broadside loads down counters 8 and 9 with value N−n and M+m, respectively, where n and m are fixed modification values to N and M, and resets counter 10, assuming switch 14 is closed and switch 15 is open. The output signal from counter 10 holding AND-gate 11 open to clock signal from control circuit 16 to down counter 8 and sensor array 2, and through inverter 12 holding AND-gate 13 closed to clock signal from control circuit 16 to down counter 9 and sensor array 3.

The clock signal from control circuit 16 clocks out the individual sensor signals from sensor array 2, through amplifiers 20, switch 14, signal circuit 22 to storage 18, and simultaneously decrements down counter 8 and increments counter 10. Upon down counter 8 having received (N−n) clock pulses and reached value of zero, the switch 14 opens and stops the sensor signals through signal circuit 22 to storage 18. Upon counter 10, having received the number of clock pulses corresponding to the number of individual sensors in sensor array 2, the output signal toggles to close AND-gate 11 and through inverter 12 opens AND-gate 13 to clock signal from control circuit 16 to down counter 9 and sensor array 3, the clock signal from signal circuit 16 clocks out the individual sensor signals from sensor array 3 and simultaneously decrements down counter 9 and increments counter 10. Upon down counter 9 having received (M+m) clock pulses and reached a value of zero, switch 15 closes and following clocked out individual sensor signals from sensor array 3 are led through the signal circuit 22 to storage 18.

Upon counter 10 having received the number of clock pulses corresponding to the number of individual sensors in sensor array 3, the paper drive 19 brings the original 6 one step forward and output signal from counter 10 toggles to repeat the above sequence for the next scan line on original 6.

Figure 6:
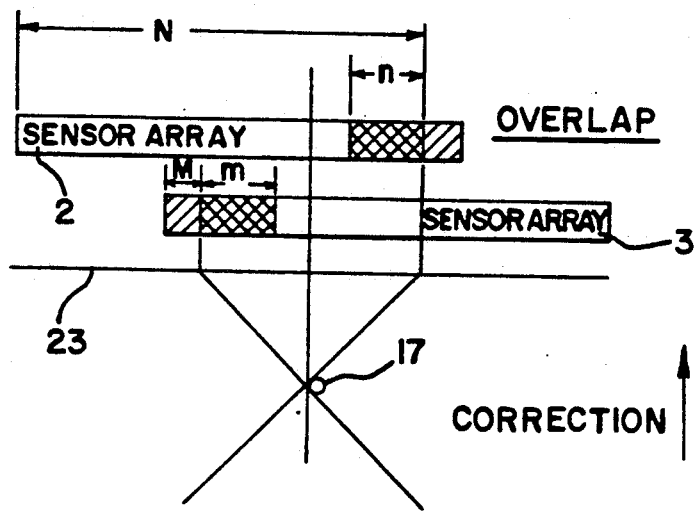
FIG. 6 shows correction of the overlap fault of FIG. 3 by adjusting the wire.

For initial alignment of the multiplexed sensor arrays 2 and 3 a test pattern similar to the one shown in FIG. 2 is scanned as described above. The scanned image as shown in FIG. 3 may have a gap in the corresponding position to the cross over point between sensor arrays 2 and 3 as shown in FIG. 5. This can be corrected by adjusting the wire 17 away from background 22 and repeating the previously described pre-scan to update the values of N and M and repeating the scanning of the test pattern shown in FIG. 2. The scanned image as shown in FIG. 4 may have an overlap in the corresponding position to the cross over point between sensor arrays 2 and 3 as shown in FIG. 6. This can be corrected by adjusting the wire 17 closer to the background 22 and repeating the previously described pre-scan to update the values of N and M and repeating scanning of the test pattern shown in FIG. 2.

Figure 7:
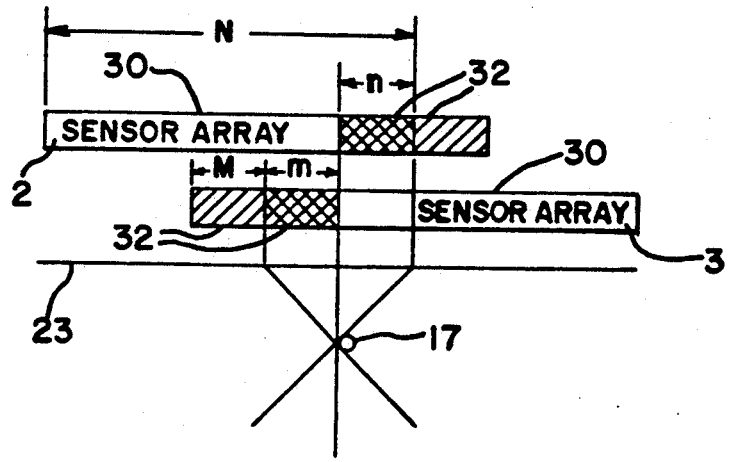
FIG. 7 shows correctly adjusted wire and aligned multiplexed sensor arrays.

Repeating a number of times the above process of pre-scan, scanning of test pattern in FIG. 2, analyzing the scanned image and adjusting the wire 17 position accordingly in relation to the background 22 leads to the sensor arrays 2 and 3 being aligned as shown in FIG. 7, with neither gap nor overlap. In FIG. 7 the active part of the visional field imaged on the sensor arrays is denoted 30, while the visional field edge which is skipped is denoted 32.

Alternatively, the initial alignment of the multiplexed sensor arrays 2 and 3 can be performed as described above, by replacing adjustment of wire 17 with adjusting the values of n and m, e.g. by a pair of digit switches attached to the controller circuit 16 in FIG. 1.

It will be appreciated that after initial alignment, the sensor arrays 2 and 3 shown in FIG. 1 will automatically align as described each time a pre-scan is performed e.g. at power up or previous to an original 6 being scanned. It will also be seen from FIG. 7 that the wire 17 does not show in the scanned image from multiplexed sensor arrays 2 and 3.

Figure 9:
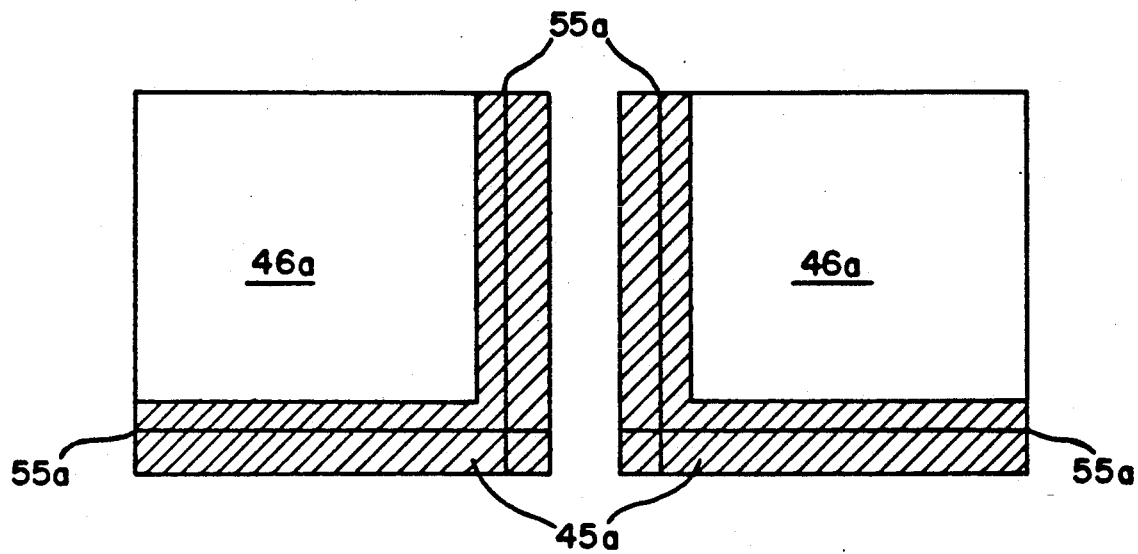
FIG. 9 shows schematically the visual fields of the individual sensor arrays in relation to the original.
Figure 11:
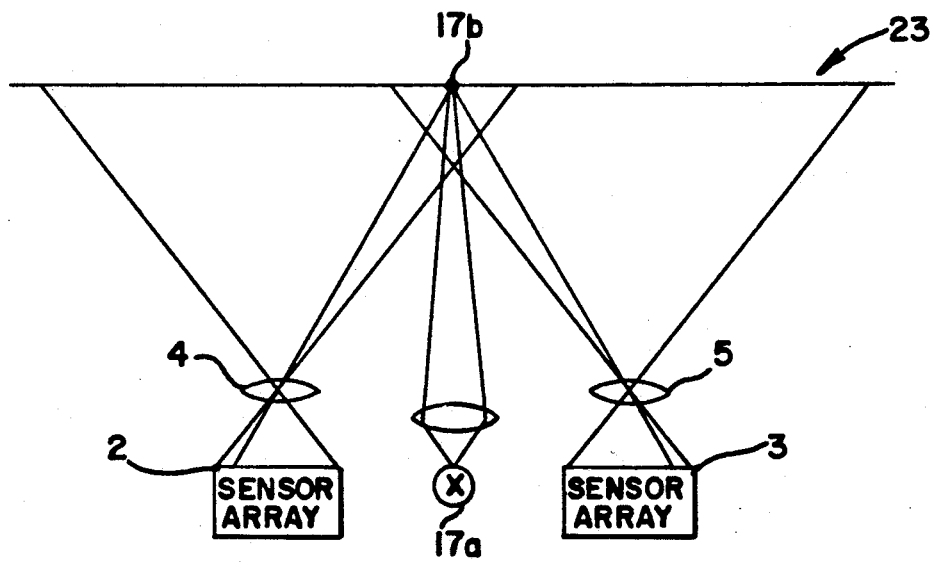
FIG. 11 shows principles of an alternative embodiment according to the invention.
Figure 8:
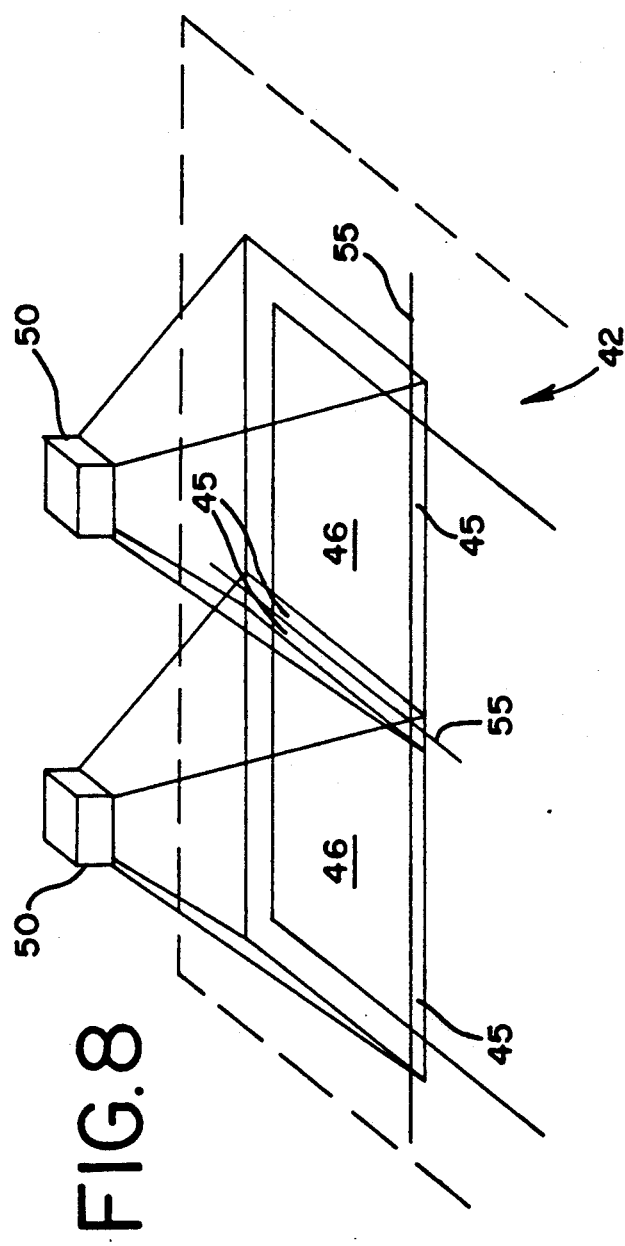
FIG. 8 shows an alternative embodiment of the scanning structure according to the invention.

The principle of joining line segments of discrete elements to form a line of discrete elements by using e.g. a wire as aligning means is not only usable in connection with CCD-sensors, but can also be used in connection with the alternative embodiment shown in FIG. 8 where an original 40 is positioned stationarily on a background 42, while the intelligence collecting is made by a number of matrix built CCD-cameras 50, two of which are shown, mounted stationarily above the background 42, the said cameras being so mounted that their active visional fields 46 together cover at least the entire original 40. The active visional fields 46 of the individual cameras are determined by aligning means 55 in the form of a wire net, which, as will appear from FIG. 8, is mounted in such a way that the individual wires are present in the visional field coinciding within two cameras 50 and are shown in such a way that the wire net is projected down onto the object plane. The initialization takes place in that all cameras 50 prior to positioning of the original 40 substantially simultaneously collect an image of their respective total visional fields 45, 46, whereafter the precision of the imaged wire net 55 is determined in a way which is analogous with the position determination of the aligning means or aligning point in the preferred embodiment with line built sensors. As it would be obvious to a person skilled in the art to modify the electronical control circuit from the preferred embodiment shown in FIG. 1 to the alternative embodiment shown in FIG. 8, the circuit part, and the lenses are omitted for the sake of clarity. As is seen from FIG. 9, the images collected by the cameras 50 will comprise an image of the aligning means 55 positioned above the original, the said means appearing on the image as several lines, 55a, where the position of the lines 55a similarly to what is described above determines which part of the camera picture should be used for joining the finished image. The image collected by the cameras 50 contain an image 55a of the wire net 55, the position of which is modified with constants depending on the hight of the wire net above the object plane. In dependence on the imaged wire net 55a it is consequently possible to divide the camera picture so that the total visional field sensed with the image can be divided into an active visional field 45a and a visional field edge 45a, where the active visional field 46a is used to join individual images to make an image of the entire original. The imaged visional field edge 45a is skipped during the procedure to join the picture by means of multiplexing.

Figure 10:
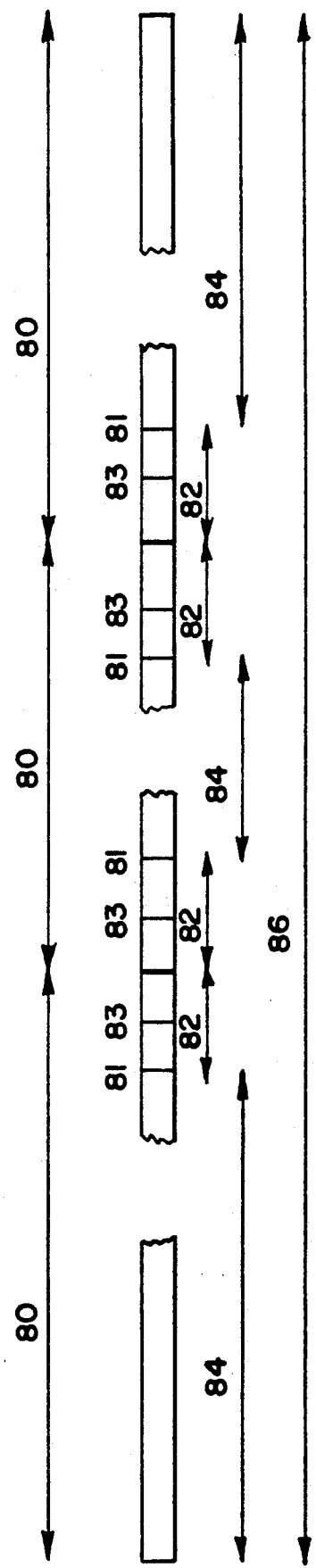
FIG. 10 shows sorting of line segments.

FIG. 10 shows how the amount of data from a line 86 transversely to an original is sorted. From the first sensor array 2, 3 a line vector 80 is clockecd out, where the elements 84 representing the active visional field of the sensor array are passed to storage 18, while the elements 82 representing the visional field edge are skipped. The wire 17 is imaged at the point 83 which by the modification, in dependence on the wire 17 being at a given hight above the background 23, is passed to a modified wire position 81, which then determines the limit between the active visional field 84 and the visional field edge 82. Thus, an image of the line transversely to the original 6 is formed by joining elements 84 representing all the active visional fields of the sensor array, while cells 82 representing the visional field edges are skipped.

In the preceding text the scanning structure is studied with two line sensors, but it should be understood that this number has been chosen in view of clarity and consequently should not by limiting to the invention.

The individual sensors 2, 3 can advantageously be modular, but this is not necessarily so.

In an alternative embodiment the stationarily mounted aligning means 17 are replaced by a light source 17a which through a lens during the initialization forms a focused light spot 17b on the background in the area where the visional fields of the sensor arrays 2, 3 coincide. When the initialization is over and the segment vectors formed by the sensor arrays 2, 3 have been aligned, the light source 17a is switched off and the scanning procedure may then begin.

It will then by appreciated that very reliable and rational adaptive alignment of multiplexed sensor arrays can be achieved by means of the system of the invention which is very inexpensive to implement, also that it by following the system of the invention at each cross over point between sensor arrays is allowed to multiplex and adaptively align any number of sensor arrays.

I claim:

1. A method of aligning two line segments of discrete elements forming part of a line of discrete elements, comprising the steps of collecting each line segment by a light sensitive sensor array (2, 3) having a number of light sensitive cells forming a segment vector (80), dividing each sensor array (2, 3) having a total visional field into an active visional field and a visional field edge, placing aligning means (17) between the sensor arrays (2, 3) and an original (6) to be copied, imaging the aligning means (17), present in the coinciding visual field of two sensor arrays by initialization in at least one cell in the segment vector (80), determining the active visional fields of the sensor arrays in dependence on the position of the aligning means in the segment vector (80), joining the line by the cells (84) of the segment vectors, which cells (84) represent the active visional field, and skipping the cells (82) representing the visional field edge and containing the image of the aligning means (17).

2. A scanning structure for making a two dimensional; matrix built image of an original (6), where the original (6) and sensor arrays (2, 3) are moved relatively to each other simultaneously with the original (6) on an object plane (22) being illuminated by a light source (1), where reflected light is detected by adjacent sensor arrays (2, 3) which together are adapted for collecting light from a line on the original (6) transversely to the relative direction of drive, whereby a line segment is represented by pixels in the segment vector (80), characterized in that two adjacent sensor arrays (2, 3) have visional fields which partly coincide, that aligning means (17) are provided in an area between the object plane (6) and the sensor arrays (2, 3), where the visional fields of the latter coincide, that there are circuit means (8, 9, 10, 11, 12, 13, 16) for determining the pixel position of the aligning means (17) in the segment vectors (80), and that there are segment vector aligning means (8, 9, 14, 15) for aligning the segment vectors (80) to form a line vector (86), the pixels of which represent the line where the joining is adapted for skipping the pixels (82) of the segment vectors between the extreme points of the segment vectors and the pixel position of the aligning means (17), said pixels (82) containing the image of the aligning means (17).

3. A scanning structure according to claim 2, characterized in that there are drive means (19) for driving the original (6) along the object plane (23) past stationarily mounted sensor arrays (2, 3).

4. A scanning structure according to claim 2, characterized by control means (16) also being provided for modifying the pixel position of the aligning means (17) in dependence on the distance of the latter from the object plane (22).

5. A scanning structure for making a two dimensional scanned electronic image of a two dimensional original in a single passage of the original past a light source, comprising a light source directed onto the original (6) as the original (6) is driven past the light source (1), a plurality of adjacent sensor arrays (4, 5) for sensing light from the light source (1) modulated by the original (6) and directed thereto and developing signals representative of intelligence on the original of which it is desired to reproduce a scanned electronic image, said adjacent sensor arrays (2, 3) being positioned transversely to the direction of drive of the original (6), means (14, 15, 18, 22) for passing a combined signal of intelligence to an output circuit (7), aligning means positioned between said original and each adjacent pairs of said sensor arrays (2, 3), said aligning means (17) being detectable in the said signal of intelligence of each of said adjacent pairs of sensor arrays (2, 3), means (8, 9, 10, 16) for detecting said aligning means (17), and means (10) for multiplexing in relation to detection of said aligning means (17) and said aligning means (17) being adjustable to prevent overlap and gap in said combined signal of intelligence of said signals of intelligence from each of said adjacent pairs of sensor arrays (2, 3).

6. A scanning structure according to claim 2 or 5, characterized in that the aligning means (17) is a wire.

7. A structure as set forth in claim 2 or 5, and further including modification means of the multiplexing controlling means for adjusting the multiplexing in relation to the aligning means (17) to prevent overlap and gap in the combined signal of intelligence.

8. A structure as set forth in claim 2 or 5, where width of the aligning means (17) is adjustable.

9. A scanning structure according to claim 2, characterized in that the aligning means (17) is a light spot (17b) on the background (23) being focused from a light source (17a).

10. A scanning structure for making a two dimensional matrix built image of an original (40) abutting against an object plane (42) and being evenly illuminated by at least one light source (44) and where the reflected light is detected by several sensor arrays (50) which together have a visual field corresponding to the size of the original (40) which is imaged as image segments on the individual sensor arrays (50) and scanned as matrix built electrically represented intelligence in a segment image, characterized in that each sensor array (50) has a total visual field (45, 46) which is divided into an active visual field (46) and a visual field edge (45), that aligning means (55) are placed between the sensor arrays (50) and the original (40) and are provided in the coinciding visional field of two sensor arrays, which means at initialization are imaged in a number of cells in the matrix built segment image, that the active visual fields (46) of the sensor arrays (50) are determined in dependence on the position of the aligning means (55) in the matrix built segment image, that the aggregate image is joined by the cells of the segment images, which cells represent the active visual field, while the cells representing the visual field edge are skipped, said skipped cells contain the image of the aligning means (55).

11. A scanning structure according to claim 9, characterized in that the aligning means (55) is a wire net.

* * * * *

UNITED STATES PATENT AND TRADEMARK OFFICE
CERTIFICATE OF CORRECTION

PATENT NO. : 5,117,295
DATED : May 26, 1992
INVENTOR(S) : Asbjorn Smitt

Page 1 of 2

It is certified that error appears in the above-identified patent and that said Letters Patent is hereby corrected as shown below:

IN THE REFERENCES CITED

On the title page, column 1, under the heading "U.S. PATENT DOCUMENTS" at the "4,774,592" reference, after "Suzuki et" please delete "1" and substitute therefor --al--.

In column 1, line 56, please delete "pixel" and substitute therefor --pixels--.

In column 6, line 4, please delete "showh" and substitute therefor --shown--.

In column 6, line 10, after "lines", please delete ",".

In column 6, line 20, please delete "45a" and substitute therefor --46a--.

UNITED STATES PATENT AND TRADEMARK OFFICE
CERTIFICATE OF CORRECTION

PATENT NO. : 5,117,295
DATED : May 26, 1992
INVENTOR(S) : Asbjorn Smitt

It is certified that error appears in the above-identified patent and that said Letters Patent is hereby corrected as shown below:

In column 6, line 28, please delete "clockecd" and substitute therefor --clocked--.

Column 7:

In Claim 2, line 2, after "sional" please delete ";".

Signed and Sealed this

Tenth Day of May, 1994

Attest:

BRUCE LEHMAN

Attesting Officer

Commissioner of Patents and Trademarks